UNITED STATES PATENT OFFICE.

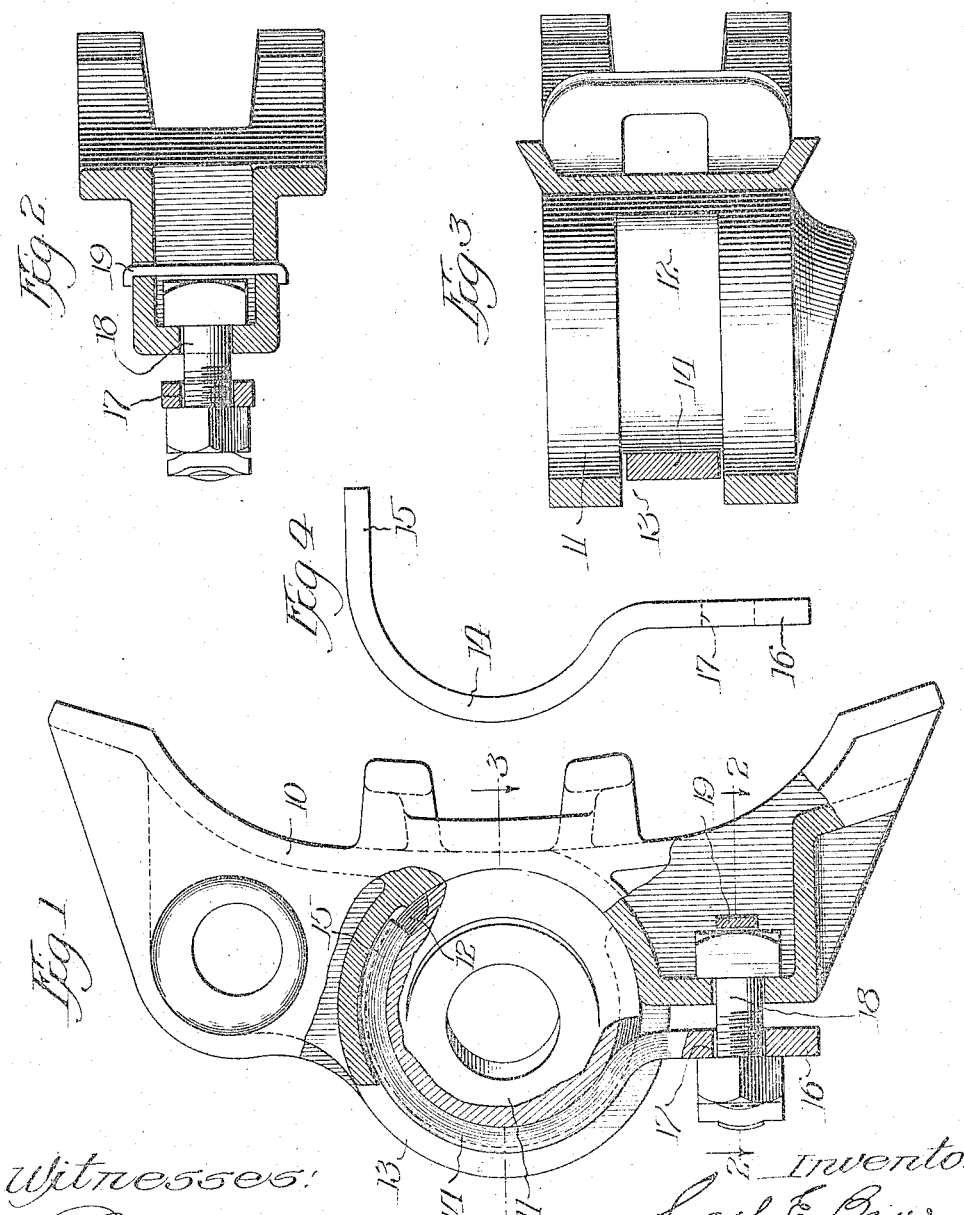

CARL E. BAUER, OF HAMMOND, INDIANA, ASSIGNOR TO AMERICAN STEEL FOUNDRIES, OF NEW YORK, N. Y., A CORPORATION OF NEW JERSEY.

BRAKE-HEAD.

1,135,490.

Specification of Letters Patent.

Patented Apr. 13, 1915.

Application filed June 5, 1914. Serial No. 843,149.

*To all whom it may concern:*

Be it known that I, CARL E. BAUER, a citizen of the United States, residing at Hammond, in the county of Lake and State of Indiana, have invented certain new and useful Improvements in Brake-Heads, of which the following is a specification.

My invention relates to railway brakes and has particular reference to a novel adjustable brake head.

It is found desirable in many instances to employ brake heads which shall be adjustably mounted on the beams and many forms of adjusting devices have been suggested whereby this result may be secured.

An object in the present invention is to provide a brake head which shall be adapted to be fitted upon the sleeve and which shall be circumferentially complete at the point of engagement with the sleeve; this for the reason that many times a brake shoe becomes broken and the load is unequally applied to the face of the head. If the head is not complete circumferentially it is commonly broken through the horizontal body portion thereof.

A further object in the present construction is to provide a simple locking device which may be readily applied and which if broken or worn may be readily replaced at any repair point of a railroad.

The invention will be more readily understood by reference to the accompanying drawings, wherein—

Figure 1 is a side elevation partly in section of a brake head mounted on a sleeve and provided with my improved locking device; Fig. 2 is a section on the line 2—2 of Fig. 1; Fig. 3 is a horizontal section on the line 3—3 of Fig. 1, the sleeve being omitted; and Fig. 4 is a side elevation of my novel locking device prior to application to the head.

Referring more particularly to the drawings, it will be seen that the head 10 is provided with a transverse opening within which a sleeve 11 is fitted. It will be noted that the bearing portion of the head is complete circumferentially, that is, is not broken at any point as in the so-called split head. This construction serves to obviate the possibility of breakage commonly occurring at or near the center of the head. The sleeve is provided with a circumferential recess 12, which recess registers with an opening 13 formed in back of the head. It will be understood of course that the sleeve is rigidly secured to the end of a brake beam and the head is rotatably mounted on the sleeve. A fastening device 14 bent to the form shown in Fig. 4 and provided with straight ends 15, 16 and with a bolt aperture 17 is adapted to be seated in the recess 12 in the sleeve, being applied through the opening 13 in the back of the head. The end 15 is allowed to remain straight prior to application to the head and to apply the same the flat end 15 is driven into place and is sprung into the position shown in Fig. 1. Thereafter a bolt 18 is applied and the tightening nuts drawn up. The strap 14 is thereby rigidly clamped to the sleeve and holds the head in adjusted position. If desired a key 19 may be inserted in front of the bolt 18 thereby preventing its accidental displacement.

It will be noted that as long as the spring plate 14 is in place the head cannot be removed from the sleeve in view of the fact that the plate rests in the groove in the sleeve. This will serve as a locking means even though the nuts should become loosened.

A construction such as described will be found exceedingly simple in manufacture and economical in maintenance.

Obviously modifications may be made in the construction shown and such modifications as are within the scope of my claims I consider within the spirit of my invention.

I claim:

1. In a device of the class described, the combination of a peripherally recessed sleeve, a head mounted thereon, said head having an opening registering with the recess in the sleeve, a spring strap having a portion thereof curved and having straight ends, one end of which is adapted to be bent by being forced into a curved space in said head, and means for clamping the free end of said strap, whereby to hold said head against rotation, substantially as described.

2. In a device of the class described, the combination of a sleeve, a head mounted thereon, a space being left between said sleeve and head at a point in the periphery of the sleeve, a spring having a straight portion adapted to be forced into the curved space between said head and sleeve, and means for clamping the free end of said spring whereby to hold said head against rotation on the sleeve, substantially as described.

3. In a device of the class described, the combination of a sleeve, a head and a spring locking device for preventing relative rotation between said head and sleeve, said locking device consisting in a curved plate having straight ends, the ends of said plate being held by engagement with the head, the curved portion of the plate bearing against said sleeve, substantially as described.

4. In a device of the class described, the combination of a recessed sleeve, a head rotatably mounted thereon, said head being cast in a single piece and being provided with an opening in its back, a flat spring having straight end portions for engagement with said head and with a curved portion engaging said sleeve and a bolt for forcing said spring against said sleeve, substantially as described.

CARL E. BAUER.

Witnesses:
CHAS. F. MURRAY,
T. D. BUTLER.